3,456,051
SOFT GELATIN SHEET FOR SOFT GELATIN CAPSULE
Hiroyuki Mima, Hyogo, and Etsunosuke Noda and Hiroto Banba, Osaka, Japan, assignors to Takeda Chemical Industries, Ltd., Osaka, Japan
No Drawing. Filed Oct. 20, 1966, Ser. No. 587,998
Claims priority, application Japan, Oct. 20, 1965, 40/64,627
Int. Cl. A61k 9/04, 15/00, 27/00
U.S. Cl. 424—37                                   10 Claims

ABSTRACT OF THE DISCLOSURE

There is provided a soft gelatin sheet which contains a buffer agent which can keep the pH value shown by the sheet when it is dissolved in water, within a pH range of about 3 to about 8.5. The gelatin sheet is utilized to form soft gelatin capsules containing active ingredient covered with the soft gelatin sheet.

---

This invention relates to a soft gelatin sheet and the use thereof in soft gelatin capsules, the capsules essentially containing one or more active ingredients, the soft gelatin sheet of this invention being especially effective for use with such active ingredient (or ingredients) to be contained therein as is (are) unstable against humidity.

Soft gelatin capsules have widely been used in various fields, especially in the medical field.

However, hitherto-known soft gelatin capsules are unavoidably bound up with such a fatal disadvantage that an active ingredient or ingredients contained therein, especially those unstable against humidity, are considerably decomposed even under general storing conditions, and as far as the present inventors are aware no hitherto-known soft gelatin sheet has succeeded in effectively preventing the decomposition of the active ingredient or ingredients, especially when the ingredient or ingredients are unstable against humidity.

The present inventors have unexpectedly found that an active ingredient or ingredients can effectively be prevented from decomposition due to humidity when covered or coated with a soft gelatin sheet containing a buffer agent that can maintain the pH value shown by the soft gelatin sheet when the soft gelatin sheet is dissolved in water within a pH range where the active ingredient (or ingredients) to be covered or coated with the sheet is (are) kept stable in its aqueous solution. Hereinafter, "the pH value shown by the soft gelatin sheet when it is dissolved in water" is simply abbreviated as "the pH value of the soft gelatin sheet."

The present invention has been accomplished on the basis of this new finding.

The principal object of this invention is to provide a soft gelatin sheet useful for production of remarkably stable soft gelatin capsules containing active ingredient or ingredients, especially those unstable against humidity.

Another object of this invention is to provide soft gelatin capsules which contain an active ingredient or ingredients, especially those unstable against humidity, and which can be kept stable for a long period without decomposition of the active ingredient or ingredients.

The composition of the soft gelatin sheet of this invention substantially comprises a conventional soft gelatin composition and such a buffer agent that can keep the pH, shown by the soft gelatin sheet when it is dissolved in water, within a pH range wherein the active ingredient (or ingredients) to be coated with the sheet is (are) kept stable in aqueous solution. The pH of the soft gelatin sheet of this invention is preferably kept within the range of about 3 to about 8.5 by the action of a buffer agent coexisting in the gelatin sheet, because when the pH value deviates from the said range, the soft gelatin sheet itself becomes liable to be decomposed.

As the buffer agent in the present invention, there may be employed, for example, primary phosphate (e.g. sodium dihydrogen phosphate, potassium dihydrogen phosphate, etc.), secondary phosphate (e.g. disodium hydrogen phosphate or dipotassium hydrogen phosphate), glycine, glycine hydrochloride, glycine tartrate, sodium salt of glycine, potassium salt of glycine, tartaric acid, sodium tartrate, citric acid, sodium tartrate, lactic acid, sodium lactate, acetic acid, sodium acetate or a mixture of two or more thereof.

The buffer agent employed is selected from per se known buffers as exemplified above, so that the pH value of the soft gelatin sheet may be kept within a range wherein the active ingredients to be coated with the sheet are kept stable in water. Therefore, the most preferable buffer agent to be selected varies with the kind of active ingredient or ingredients, although any of the thus-selected buffer agents can keep the pH value of the soft gelatin sheet within the range of about pH 3 to about pH 8.5.

For example, when the active ingredient or ingredients to be covered or coated with the soft gelatin sheet consist chiefly of those which can be kept stable in water within a pH range of about 3 to about 5 (e.g. vitamin $B_1$ hydrochloride, vitamin $B_1$ mononitrate, acetyl salicylic acid, carbochromene and procaine), such a buffer agent may advantageously be employed as glycine, glycine hydrochloride, citric acid, acetic acid, a mixture of tartaric acid and sodium tartrate, a mixture of lactic acid and sodium acetate, etc.; when consisting chiefly of those which can be kept stable in water within a pH range of about 4 to about 6 (e.g. chloramphenicol or 21-hydrocortisone hemisuccinate), the buffer may be advantageously employed as a mixture of tartaric acid and sodium tartrate, disodium hydrogen phosphate or sodium tartrate; when consisting chiefly of those which can be kept stable in water within a pH range of about 6 to about 8 (e.g. phenobarbital, barbital, chloral hydrate and pyridoxal phosphate), the buffer may be advantageously employed as disodium hydrogen phosphate, tartaric acid, sodium tartrate, sodium dihydrogen phosphate, sodium lactate, a mixture of disodium hydrogen phosphate and citric acid; and when consisting chiefly of those which can be kept stable in water within a pH range of about 7 to about 8.5 (e.g. adenosine triphosphate), the buffer may be advantageously employed as sodium dihydrogen phosphate, disodium hydrogen phosphate, a mixture of disodium hydrogen phosphate and citric acid, sodium lactate.

The amount of the buffer agent to be added is preferably about 7 percent to about 22 percent by weight of the amount of gelatin. When the amount of the buffer agent is more than about 22 percent, the soft gelatin sheet tends to be fragile, while an amount of buffer agent of less than about 7 percent cannot effectively keep the pH of the soft gelatin sheet at a desired value.

As the soft gelatin composition to which the buffer agent is to be added, any conventional gelatin composition may be employed, and it essentially consists of gelatin and a plasticizer. The plasticizer may be selected from conventional ones such as glycerin, propylene glycol or sorbitol. If desired, antiseptics such as alkyl ester of p-hydroxy benzoic acid (e.g. methyl-, ethyl-, propyl- or butyl ester), flavors (e.g. vanillin or ethylvanillin), food dye such as Food Drug and Cosmetic Red No. 5, Food Drug and Cosmetic Yellow No. 4), additives and so on may be contained in the gelatin composition.

The soft gelatin sheet of the present invention may be prepared after a per se known manner, for example, by mixing gelatin, plasticizer, the buffer agent and other agent and other ingredient, if desired, antiseptic, food dye, flavor, additive, etc., with water to make an aqueous gelatin mixture having the desired pH value (i.e. pH value falling within the range wherein active ingredient to be coated with the soft gelatin sheet is kept stable in water), heating the thus-prepared mixture at a temperature of about 80 to about 120° C. to give soft gelatin sol, and subsequently shaping the sol into sheet form in per se conventional manner, for example, by rolling the sol.

As the above-prepared aqueous gelatin mixture is a rather viscous liquid, the check of pH value of the mixture is preferably carried out by sampling a small amount of the mixture and dissolving it in water and measuring the pH value of the aqueous solution.

The soft gelatin sheet of this invention is advantageously used for the preparation of soft gelatin capsules containing such active ingredient or ingredients as are liable to be decomposed by humidity, e.g. vitamin $B_1$ hydrochloride, vitamin $B_1$ mononitrate, nicotinic acid, adenosine triphosphate, vitamin $B_6$, vitamin $K_4$ phosphate, chloramphenicol, acetylsalicylic acid, diethylaminoethyl acetylsalicylate hydrochloride, 21-hydrocortisone hemisuccinate, 21-hydrocortisone hemiadipate, 21-hydrocortisone suberate, 21-hydrocortisone phosphate, prednisolone hemi-$\beta,\beta'$-dimethyl-glutarate, 6$\alpha$-methylprednisolone hemi-$\beta,\beta'$-dimethyl-glutarate, atropine, homotropine, scopolamine, procaine, benzocaine, chloral hydrate, barbital, phenobarbital or carbochromene. The active ingredient may be used singly or as a mixture of two or more thereof, with or without pharmaceutically acceptable carrier and other additives.

Preparation of the soft gelatin capsule by the use of the present soft gelatin sheet may be achieved by per se known method, for example, by using a soft gelatin capsulating machine such as Colton type machine (Colton Co., U.S.A.), Scherer type machine (Scherer Co., U.S.A.), etc. Thus prepared capsule can be stored for a long period without or with but little decomposition of active ingredient contained therein.

The following examples set forth presently preformed typical illustrative embodiments of the invention. Parts by weight therein bear the same relation to parts by volume as do grams to milliliters.

EXAMPLE 1

To 300 parts by volume of distilled water are added 150 parts by weight of gelatin, 30 parts by weight of glycerin, 0.7 part by weight of methyl p-hydroxybenzoate, 0.4 part by weight of propyl p-hydroxybenzoate and 10 parts by weight of glycine hydrochloride as a buffer agent. The mixture, which shows a pH of 4, is heated at 100° C. for 12 hours to make the whole a homogeneous sol. Thus-prepared sol is rolled to give soft gelatin sheet.

On the other hand, 1.1 parts by weight of vitamin $B_1$ hydrochloride, 0.4 part by weight of vitamin $B_2$, 0.7 part by weight of vitamin $B_6$ and 2.8 parts by weight of lactose are homogeneously admixed with 5 parts by weight of sesame oil to give paste. The paste is then shaped into pilules, each of which contains 0.1 gram of the paste. The pilules are coated with the above-prepared soft gelatin sheet by the use of a Colton type continuous capsulating machine (Colton Co., U.S.A.) to produce soft gelatin capsules.

After the capsules are stored at room temperature (about 15° to about 30° C.) for one year, the vitamin $B_1$ content in each capsule, measured by the thiochrome method, is about 99 percent in average of the initial content of vitamin $B_1$ hydrochloride.

On the contrary, in case of soft gelatin capsules prepared by the same manner as above except no use of 10 parts by weight of glycine hydrochloride, the content of vitamin $B_1$ hydrochloride retained in the capsules is only about 75 percent in average of the initial content after storage for one year at room temperature.

EXAMPLE 2

In similar manner as in Example 1, a soft gelatin sheet is prepared from an aqueous gelatin mixture of pH about 6.5 consisting of 300 parts by weight of distilled water, 150 parts by weight of gelatin, 30 parts by weight of glycerine, 0.7 part by weight of methyl p-hydroxybenzoate, 0.4 part by weight of propyl p-hydroxybenzoate, 0.02 part by weight of Food Drug and Cosmetic Red No. 2 and 0.04 part by weight of Food Drug and Cosmetic Yellow No. 4, and 20 parts by weight of sodium tartrate as a buffer agent.

On the other hand, paste is prepared by homogeneously mixing 1 part by weight of barbital, 1.3 parts by weight of lactose and 5 parts by weight of sesame oil.

Gelatin soft capsules each of which contains 0.1 gram of the paste are prepared in a similar manner as in Example 1.

After the soft gelatin capsules are stored at room temperature for one year, the barbital content in each capsule, measured by colorimetric analysis, is about 87 percent in average of the initial content of barbital.

On the contrary, in case of soft gelatin capsules prepared in the same manner as above except no use of 20 parts by weight of sodium tartrate, the content of barbital retained in the capsules is only about 63 percent in average of the initial content after storage for one year at a room temperature.

EXAMPLE 3

In a similar manner as in Example 1, a soft gelatin sheet is prepared from an aqueous mixture of pH about 8 consisting of 300 parts by weight of distilled water, 150 parts by weight of glycerin, 0.7 part by weight of methyl p-hydroxybenzoate, 0.02 part by weight of Food Drug and Cosmetic Red No. 2, 0.04 part by weight of Food Drug and Cosmetic Yellow No. 4 and 18 parts by weight of disodium hydrogen phosphate and 1 part by weight of citric acid (as buffer agents).

On the other hand, 0.5 part by weight of adenosine triphosphate and 9.5 parts by weight of lactose are homogeneously mixed and powdered.

Gelatin soft capsules each of which contains 0.2 gram of the powder are prepared in a similar manner as in Example 1.

After the soft gelatin capsules are stored at a room temperature for one year, the adenosine triphosphate in each capsule, measured by the phosphomolybdic acid method, is about 73 percent in average of the initial content.

On the contrary, in case of soft gelatin capsules prepared in the same manner as above except no use of the 18 parts by weight of disodium hydrogen phosphate and 1 part by weight of citric acid, the content of adenosine triphosphate retained in each capsule is only about 20 percent in average after storage under the same conditions.

EXAMPLE 4

In the same manner as in Example 1, a soft gelatin sheet is prepared.

On the other hand, 10 parts by weight of carbochromene, 5 parts by weight of sesame oil and 1 part by weight of white Japan wax are homogeneously mixed, and the mixture is made into a paste.

Soft gelatin capsules each of which contains 160 milligrams of the paste are prepared in a similar manner as in Example 1.

After the soft gelatin capsules are stored at a room temperature for one year, the content of carbochromene in each capsule, by colorimetry with use of orange II, is about 98 percent in average of the initial content of carbochromene.

On the contrary, in case of soft gelatin capsules prepared in the same manner as above except no use of the 10 parts by weight of glycine hydrochloride, the content of carbochromene in each capsule is only about 72 percent in average of the initial content after storage under the same conditions.

EXAMPLE 5

In a similar manner as in Example 1, a soft gelatin sheet is prepared from an aqueous mixture of pH about 4 consisting of 70 parts by weight of gelatin, 140 parts by weight of water, 15 parts by weight of glycerin, 14.5 parts by weight of sorbitol, 0.3 part by weight of methyl p-hydroxybenzoate and 15 parts by weight of citric acid (as buffer agent).

On the other hand, 0.05 part by weight of acetyl salicylic acid, 0.03 part by weight of opium powder, 0.03 part by weight of ipecacuanha powder and 0.44 part by weight of sesame oil are mixed homogeneously to give a paste.

Soft gelatin capsules each of which contains 0.333 gram of the paste are prepared in a similar manner as in Example 1.

After the capsules are stored at a room temperature for one year, the content of the acetyl salicylic acid in each capsule measured by alkalimetry, is about 88 percent in average of the initial content of acetyl salicylic acid.

On the contrary, in case of soft gelatin capsules prepared by the same manner as above except no use of 10.5 parts by weight of citric acid, the content of the acetyl salicylic acid is only about 63 percent in average of the initial content after storage under the same conditions.

EXAMPLE 6

In a similar manner as in Example 1, a soft gelatin sheet is prepared from an aqueous mixture of pH about 7 consisting of 140 parts by weight of water, 70 parts by weight of gelatin, 15 parts by weight of glycerin, 14.5 parts by weight of sorbitol, 0.3 part by weight of methyl p-hydroxybenzoate, 0.15 part by weight of propyl p-hydroxybenzoate and 8 parts by weight of disodium hydrogen phosphate (as buffer agent).

On the other hand, 0.03 part by weight of phenobarbital, 0.05 part by weight of aminopyrine, 0.05 part by weight of sesame oil are homogeneously mixed to give a paste.

Soft gelatin capsules each of which contains 0.333 gram of the paste are prepared as in Example 1.

After the capsules are stored at room temperature for one year, the content of phenobarbital in each capsule, by colorimetry, is about 93 percent in average of the initial content.

On the contrary, in case of soft gelatin capsules prepared in the same manner as above except no use of the 5.6 parts by weight of disodium hydrogen phosphate, the content of phenobarbital retained in each capsule is only about 72 percent in average of the initial content.

EXAMPLE 7

In a similar manner as in Example 1, a soft gelatin sheet is prepared from an aqueous mixture of pH about 6 consisting of 70 parts by weight of gelatin, 15 parts by weight of glycerin, 14.5 parts by weight of sorbitol, 0.3 part by weight of methyl p-hydroxybenzoate, 140 parts by weight of water and 5 parts by weight of tartaric acid (as buffer agent).

On the other hand, equiamounts by weight of chloral hydrate and olive oil are homogeneously mixed to give an oily mixture.

Soft gelatin capsules each of which contains 0.333 gram of the oily mixture are prepared in a similar manner as in Example 1.

After the capsules are stored at a room temperature for one year, the content of chloral hydrate retained in each capsule, measured by alkalimetry, is about 83 perecnt in average of the initial content.

On the contrary, in case of soft gelatin capsules prepared in the same manner as above except no use of the 3.5 parts by weight of chloral hydrate, the content of chloral hydrate in each capsule is only about 61 percent in average of the initial content after storage under the same conditions.

EXAMPLE 8

In a similar manner as in Example 1, a soft gelatin sheet is prepared from an aqueous mixture of pH about 4.5 consisting of 70 parts by weight of gelatin, 15 parts by weight of glycerin, 14.5 parts by weight of sorbitol, 0.3 part by weight of methyl p-hydroxybenzoate, 0.15 part by weight of propyl p-hydroxybenzoate, 140 parts by weight of distilled water, and 5 parts each of tartaric acid and sodium tartrate (as buffer agents).

On the other hand, equiamounts by weight of chloramphenicol and lactose are homogeneously mixed, and the mixture is powdered.

Soft gelatin capsules each of which contains 0.2 gram of the powder are prepared in a similar manner as in Example 1.

After the capsules are stored at a room temperature for one year, the content of chloramphenicol in each capsule, by colorimetry, is about 93 percent in average of the initial content.

On the contrary, in case of soft gelatin capsules prepared by the same manner as above except no use of the 3.5 parts by weight each of tartaric acid and sodium tartrate, the content of chloramphenicol in each capsule is only about 69 percent in average of the initial content after storage under the same conditions.

What we claim is:

1. A soft gelatin humidity-stable capsule containing therein an active ingredient which is liable to be decomposed by humidity, and which, when it is dissolved in water, is stable in an aqueous solution if kept within the pH range of about 3 to about 8.5, said humidity-unstable active ingredient having been homogeneously admixed into paste pilules with oily and/or dry pulverulent excipients, said paste pilules having been encapsulated into plasticized soft gelatin capsules formed from humidity-stabilized buffered soft gelatin sheet stock feed material structurally dimensioned for continuous feeding into conventional soft gelatin continuous capsulating machines, said soft gelatin sheet characterized by essentially containing about 7 to about 22% by weight of a pre-measured and checked amount of a pharmaceutically acceptable buffer agent, maintaining the sheet to show a pH range of about 3 to about 8.5 when the sheet is dissolved in water, the said soft gelatin sheet liable to become decomposed itself when the pH value deviates from the said pH range.

2. A soft gelatin capsule as claimed in claim 1, wherein the active ingredient is selected from the group consisting of vitamin $B_1$ hydrochloride, adenosine triphosphate, vitamin $B_6$ phosphate, acetylsalicylic acid, 21-hydrocortisone hemisuccinate, procaine and carbochromene.

3. A soft gelatin capsule according to claim 2, wherein the active ingredient is vitamin $B_1$ hydrochloride and the soft gelatin sheet contains glycine hydrochloride.

4. A soft gelatin capsule according to claim 2, wherein the active ingredient is barbital and the soft gelatin sheet contains sodium tartrate.

5. A soft gelatin capsule according to claim 2, wherein the active ingredient is adenosine triphosphate and the soft gelatin sheet contains disodium hydrogen phosphate and citric acid.

6. A soft gelatin capsule according to claim 2, wherein the active ingredient is carbochromene and the soft gelatin sheet contains glycine hydrochloride.

7. A soft gelatin capsule according to claim 2, wherein the active ingredient is acetylsalicylic acid and the soft gelatin sheet contains citric acid.

8. A soft gelatin capsule according to claim 2, wherein the active ingredient is phenobarbital and the soft gelatin sheet contains disodium hydrogen phosphate.

9. A soft gelatin capsule according to claim 2, wherein the active ingredient is chloral hydrate and the soft gelatin sheet contains tartaric acid.

10. A soft gelatin capsule according to claim 2, wherein the active ingredient is chloramphenicol and the soft gelatin sheet contains tartaric acid and sodium tartrate.

References Cited

UNITED STATES PATENTS 2,870,062  1/1959  Stanley et al. _____ 424—37

S. K. ROSE, Primary Examiner

U.S. Cl. X.R.

161—36; 260—117